3 Sheets—Sheet 1.

C. A. HARKNESS.

ELEVATOR CONTROLLING DEVICE.

No. 11,520. Reissued Jan. 7, 1896.

WITNESSES.
Matthew M. Blunt.
C. C. Stecher.

INVENTOR.
C. A. Harkness
by A. W. Crosby
ATT'Y.

3 Sheets—Sheet 2.
C. A. HARKNESS.
ELEVATOR CONTROLLING DEVICE.
No. 11,520. Reissued Jan. 7, 1896.
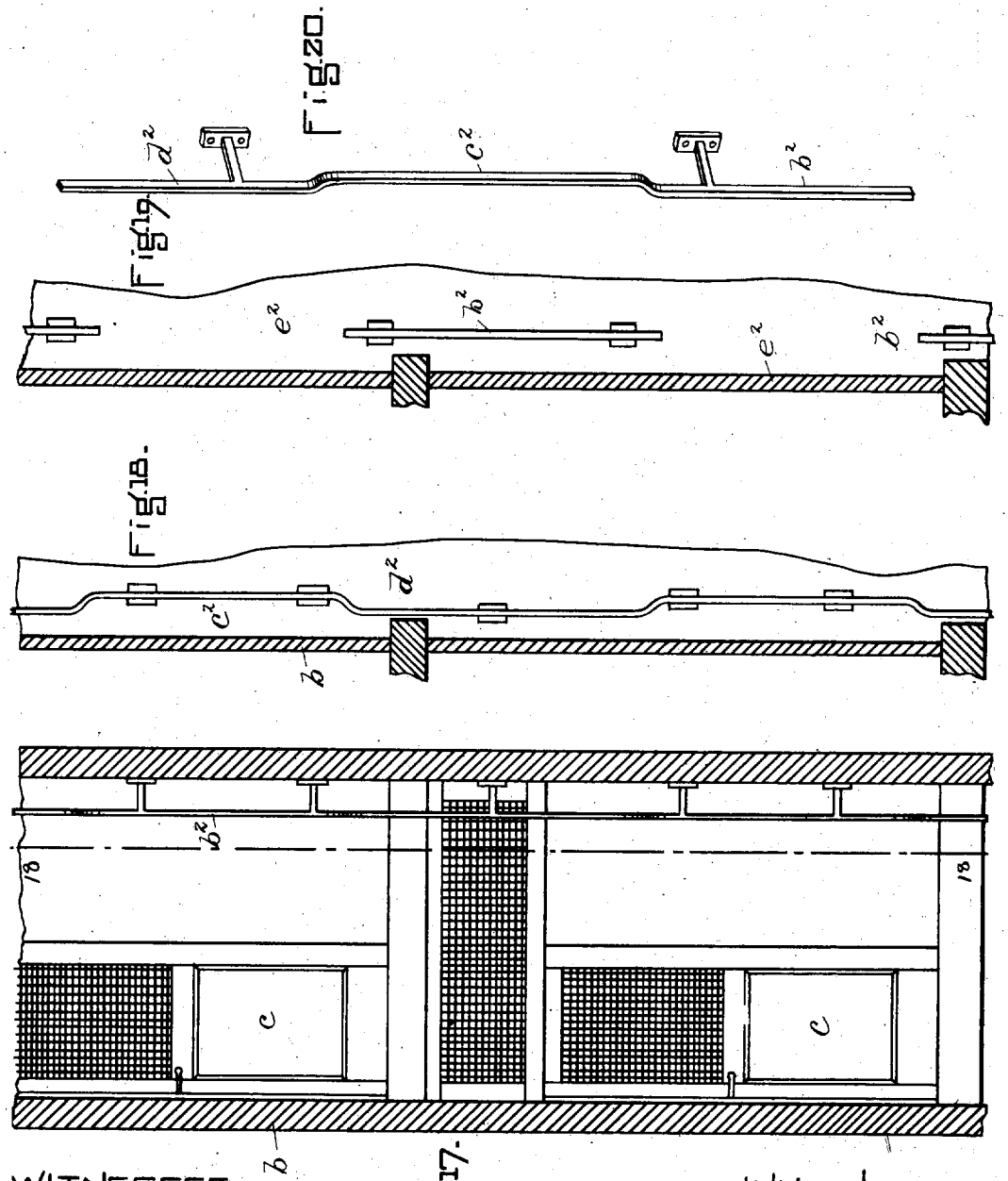
WITNESSES.
Matthew M. Blunt
C. C. Fischer
INVENTOR.
C. A. Harkness
by Geo. Rossley
ATT'Y.

C. A. HARKNESS.
ELEVATOR CONTROLLING DEVICE.
No. 11,520. Reissued Jan. 7, 1896.
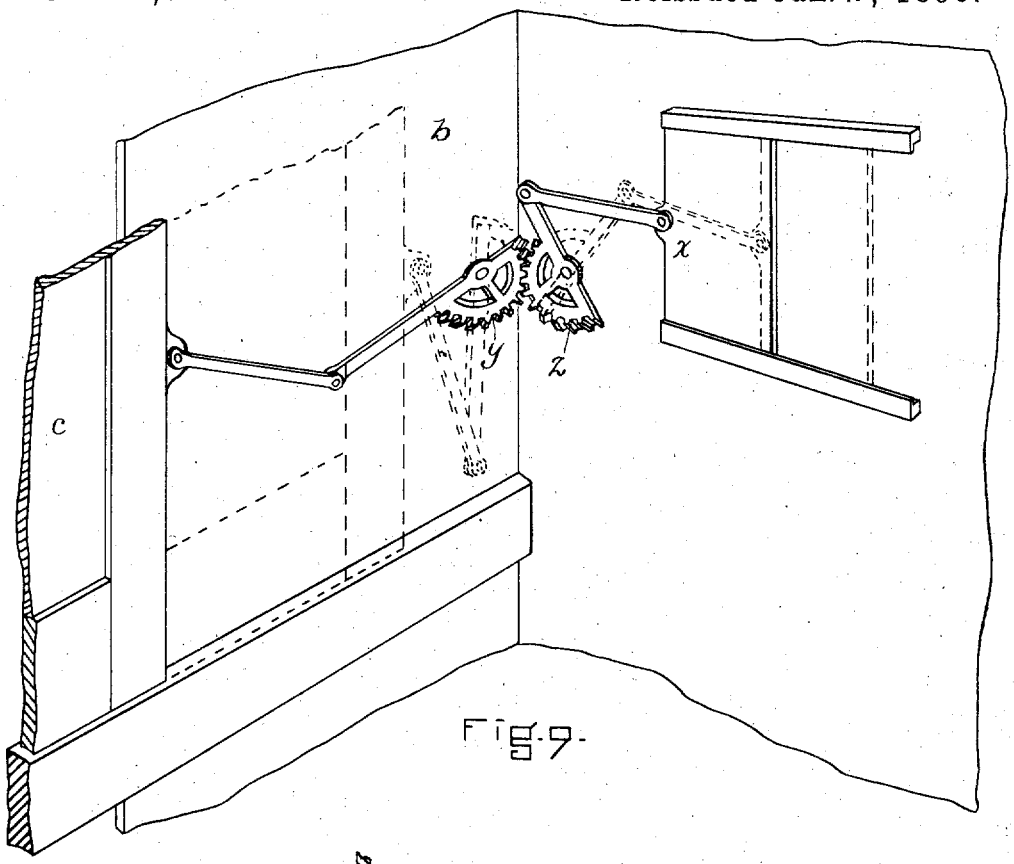
Fig. 9.
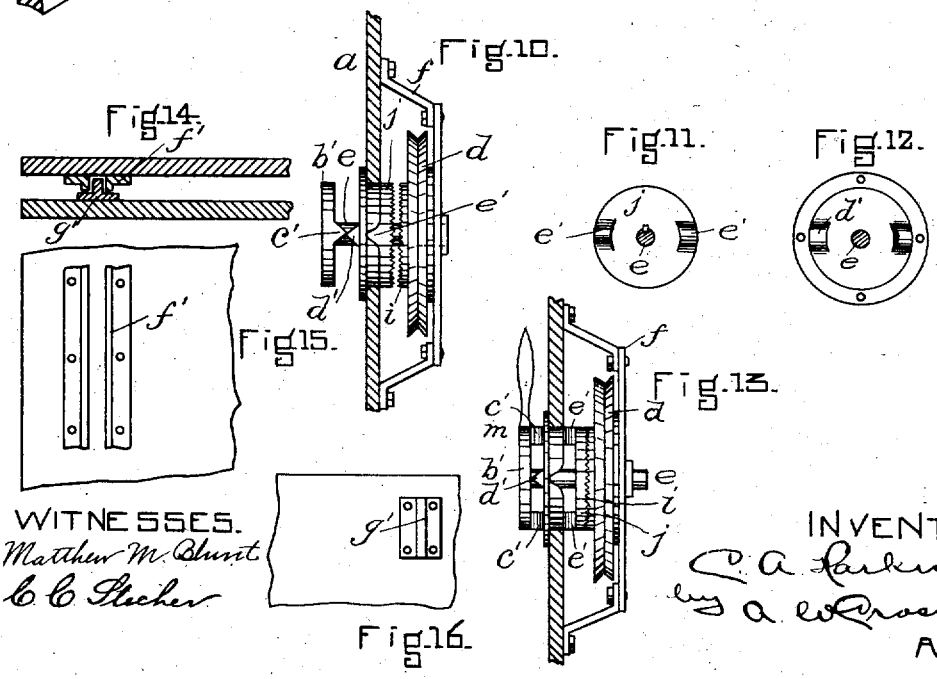
WITNESSES.
Matthew M. Blunt
C. C. Fletcher
INVENTOR.
C. A. Harkness
by A. W. Crosby
ATT'Y.

UNITED STATES PATENT OFFICE.

CHARLES A. HARKNESS, OF PROVIDENCE, RHODE ISLAND.

ELEVATOR-CONTROLLING DEVICE.

SPECIFICATION forming part of Reissued Letters Patent No. 11,520, dated January 7, 1896.

Original No. 522,161, dated June 26, 1894. Application for reissue filed January 2, 1895. Serial No. 533,652.

*To all whom it may concern:*

Be it known that I, CHARLES A. HARKNESS, of Providence, in the county of Providence and State of Rhode Island, have invented certain new and useful Improvements in Elevator-Controlling Devices, of which the following is a specification.

This invention has relation to elevators or lifts used to carry passengers and freight from story to story of high buildings or edifices.

It is the object of the invention to provide means of simple structural character for controlling the movement of the car, which means cannot be actuated to start the elevator in its movement up or down until the door of access to and egress from the car is closed, so that there may be no liability to accident or injury to persons by means of an open or partially open door while the car is in motion.

It is also the object of the invention to provide a construction whereby the starting-rope may be arranged in such way that passengers may not mischievously or otherwise meddle with the rope.

It is also the object of the invention to provide improved means for stopping the car of an elevator or lift in its upward or downward movement.

It is also the object of the invention to provide other improvements of greater or less importance incident to the foregoing.

The invention consists of the novel construction, arrangement and relationship of parts, as I will now proceed to describe in detail and point out in the claims hereto appended.

Reference is to be had to the annexed drawings and to the letters marked thereon, forming a part of this specification, the same letters designating the same parts or features, as the case may be, wherever they occur.

Figure 1:
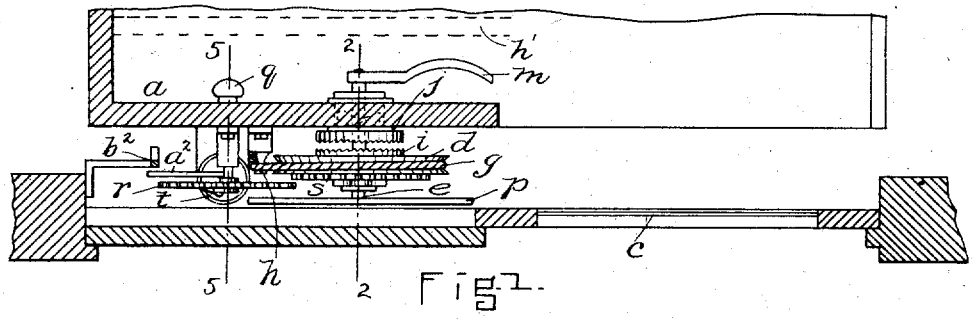
Figure 2:
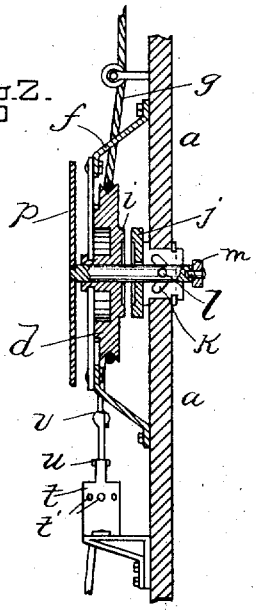
Figure 3:
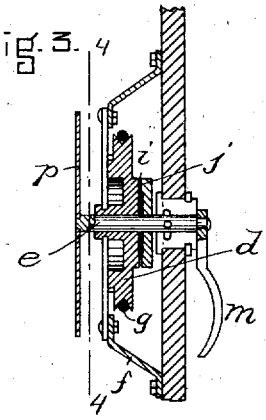
Figure 4:
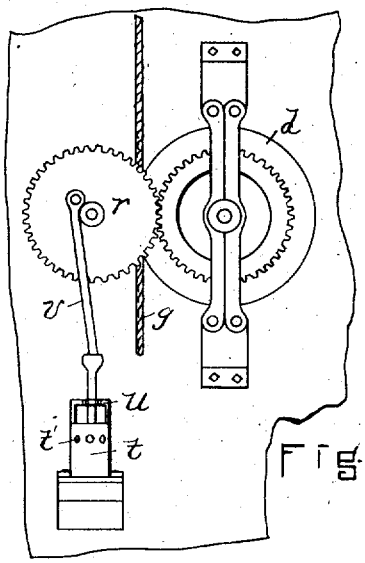
Figure 5:
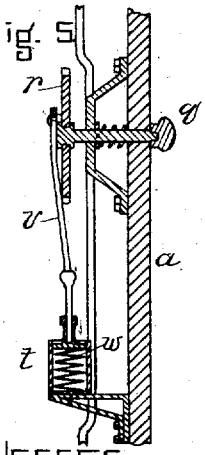
Figure 6:
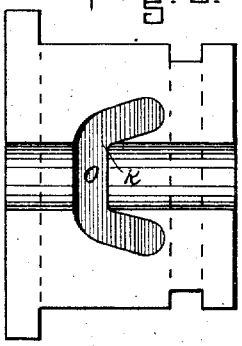
Figure 7:
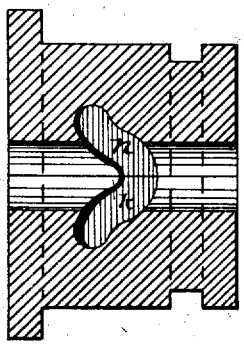
Figure 8:
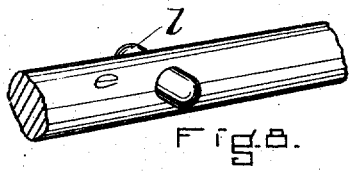

Of the drawings, Figure 1 is a horizontal sectional view of the front of a car or lift and the casing of an elevator-well and its door, the car being shown as equipped with my invention, which is portrayed in plan. Fig. 2 is a vertical sectional view of part of the invention, taken on the line 2 2 of Fig. 1. Fig. 3 is a view somewhat similar to Fig. 2, but showing a different position of some of the parts. Fig. 4 is a sectional front or outside view taken on the line 4 4 of Fig. 3. Fig. 5 is a vertical sectional view taken on the line 5 5 of Fig. 1. Figs. 6, 7, and 8 are sectional detail views of parts of the devices for effecting the starting of the car-moving means hereinafter particularly described. Fig. 9 shows a modified form of means for connecting the door with the controlling devices. Figs. 10 to 13, inclusive, are sectional views showing modified forms of parts of the controlling devices. Figs. 14 to 16, inclusive, are detail views of parts hereinafter particularly referred to. Figs. 17 to 20, inclusive, are illustrations of means which may be employed to insure the stopping of the car with certainty at the desired points.

In the drawings, *a* designates the frame of the car, and *b* is the frame or casing to the elevator-well in which the car runs.

My invention contemplates the co-operative employment of the door by which access is gained to and egress from the car, and this door may be in the car itself or in the casing to the elevator-well.

As the invention is herein represented it is employed in connection with the door *c* in the elevator-well casing.

*d* designates a wheel or pulley constructed and arranged so as to be normally loose on a longitudinally-movable shaft *e*, which shaft is supported in bearings in the car-casing and in the wheel or pulley, the latter having its bearings in a bracket *f* connected with the car-casing.

The wheel or pulley *d* constitutes a device which is in constant engagement with the controlling line or rope for operating it.

*g* designates the flexible starting and stopping rope, by which the movements of the car are controlled, which rope may be passed about the wheel or pulley *d* or otherwise connected therewith, so that by turning the said wheel slightly in one direction the car may be started on its upward course and by turning it to a certain extent in the other direction the car may be started downward, while by moving it to an intermediate point the car may be stopped. At the point where the rope *g* passes onto and leaves the pulley *d* a dividing or guide pulley *h* may be employed to keep the crossing or meeting portions of the rope in proper position on the said pulley.

*i* designates a clutch member compounded or connected with the wheel or pulley *d*, and *j* is a corresponding clutch member secured to the shaft *e*, the teeth of one of the said gears facing the other.

The bearing in the car-casing for the shaft *e* is constructed as a bushing provided with an internal cam-groove *k*, in which a pin *l* or the projecting ends thereof on the said shaft is or are adapted to operate.

*m* indicates the hand-operative device, which in this case is a handle or crank secured to the inner end of the shaft *e*, by which the latter may be turned.

The construction and arrangement of the parts last described are such that when the shaft *e* is turned so as to bring the pin *l* on the short surface or inward or most rearward point *n* of the groove *k* the said shaft and the clutch member *j* attached thereto will be drawn back and the clutch members *i j* disengaged, as shown in Figs. 1 and 2; but when the said shaft is turned so as to bring the pin *l* into the long or forward or outward part *o* of the groove *k* the said shaft and clutch member *j* will be moved outwardly, bringing the clutch members *i* and *j* into mesh and effecting a turning of the wheel or pulley *d*, as indicated in Fig. 3. Thus it will be seen that the hand-operative device or lever *m* can directly control the rope through its operative connections with the same, said operative connections being wheel or pulley *d*, the clutch members, and the shaft *e*.

The bearing in the car for the shaft *e* may be constructed as a split bushing or be otherwise formed and secured in any suitable way in the car-casing.

*p* is a disk or plate on the outer end of the shaft *e*, though it might in some cases be the outer end of the shaft itself, adapted to be brought to bear against and be stopped in its outward movement by the door when the latter is opened, but being free to be moved outward when the door is closed.

The plate *p*, together with the shaft *e*, the pin thereon, and the cam-grooved bushing, which are all independent of the controlling-line, constitute a device which coacts with the movable door for preventing the operation of the hand device when the door is partially or entirely open, for when the door is moved so as to lie in the path of the plate and the shaft the latter cannot be moved forward, and as the engagement of the pin *l* with the cam-slots in the bushing is such that the shaft *e* cannot be revolved without moving forward it follows that the said shaft and the hand device *m* are locked against rotation under such conditions. It will be seen that at times the plate *p* may be dispensed with and the shaft be employed without it.

*q* is a hand device, consisting of a spring-pressed bolt or pin, provided on its outer end with a gear *r* turning loosely on the bolt or pin, which is normally held pressed outward by the spring operating on the said bolt or pin *q*, but which may be drawn inward or backward by the said bolt against the pressure of its spring so as to be engaged by a like gear *s* connected or compounded with the pulley *d*.

*t* is an air-tight drum or cylinder in which there is arranged a piston *u*, the rod of which piston is connected by means of a pitman V with the gear *v*, the said pitman being pivoted at its upper end upon a wrist-pin eccentrically located on the said disk.

A spring *w* is located in the cylinder *t*, and is interposed between the bottom thereof and the piston, so as to assist in raising the latter. The cylinder near its top is provided with ports *t'* to admit air each time that the piston is raised as it will be by said spring to a point above the said air-inlet holes or ports.

The drum or cylinder, the piston and piston-rod, the spring-pressed bolt *q*, and the gears *r* and *s* constitute a device or mechanism secondary to the hand device before described for shifting the line to stop the car, as will be hereinafter set forth, and the drum or cylinder and the piston and its rod (with or without the spring) constitute an air-brake or cushioning mechanism, which is adapted to be connected with the device on the car in constant engagement with the line (the wheel or pulley *d*) by the said hand device above referred to. The cushioning mechanism is employed for gradually stopping the travel of the car, and is superior to a brake-shoe adapted to be brought into positive frictional engagement with the loosely-revoluble wheel employed for shifting the line, as I have found by experience that if the shoe be brought into positive frictional engagement with the line-shafting wheel the car will be brought to a sudden standstill, whereas a cushioning device may be connected with the said wheel and gradually check it.

As thus far described, the operation of the invention may be explained as follows. Supposing the car of the elevator to be in position at a floor to have the door closed, and that this is done, and all is in readiness to start the car, say upward, the attendant, taking hold of the handle *m*, moves the same in the desired direction, carrying the pin *l* on the shaft *e* from the point *n* in the cam-groove *k* outward and into the longer portion *o* of the said cam-groove. The effect of this movement will be to move the clutch member *j* into engagement with the clutch member *i*, compounded with the pulley or wheel *d*, and to move the disk or plate on the outer end of the shaft *e* into the space behind the door *c*, when the latter is closed. When, however, the door is open or partially open, the shaft *e* and plate thereon, if it is provided with one, will be stopped by the door, so that the clutch members *i j* cannot be brought into mesh. By a slight further movement of the handle *m* after the pin *l* has reached the portion *o* of the cam-groove *k* and the clutch members *i j* have been brought into mesh one with the other the pulley *d* will be turned sufficiently to actuate the starting-rope $g$, so that it will set the car in motion, after which the pin $l$ may move back in the groove $k$ to the point $n$, when the clutch members $i$ and $j$ will be disconnected or moved out of mesh, and the car will continue to rise until it reaches a point where it is desired that it should be stopped, when the attendant, taking hold of the bolt or pin $q$, may draw the same inward, bringing the gear $r$ into engagement with the gear $s$, when the former will be revolved until stopped by the air compressed in the chamber $t$ by the piston or plunger $u$ operating through the medium of the pitman $v$, the said compressed air acting with a cushioning tendency. In some instances I may dispense with the use of compressed air and employ the spring alone to automatically stop the car. The stoppage of the gear $r$ will act as a brake on the gear $s$ and stop it and the connected pulley $d$, the stoppage of the latter acting upon the starting-rope to stop the movement of the car. It will be understood, of course, that after the pulley $d$ is actuated to set the car in motion it will be revolved by the action of the rope thereon so long as the car is kept in motion, but will be brought to a stop when the car is stopped. The door may now be opened, and after the passengers or freight are discharged and the door closed, but not before, the handle $m$ may be moved in a direction contrary to that before described with the same effect, excepting that the starting-rope will be acted upon so as to cause the car to descend, as will be understood without further description. The stoppage of the car on its downward movement may be effected in the same way by the automatic stopping device, as before described, in stopping it in its ascent.

For preventing action of the secondary mechanism, except near the landings, the spring-pressed bolt $q$ may be provided with a laterally-extending arm $a^2$, (see Fig. 1,) which may act against a rod $b^2$ extending from the top to the bottom of the elevator-shaft. (See Figs. 17 to 20, inclusive.) The said rod $b^2$ may be provided at points where it is desired to stop the car with offset portions $c^2$, so arranged that when the bolt $q$ is in its normal position the arm $a^2$ will, as the car moves, ride on the straight part $d^2$, but as the car nears a landing and the attendant draws inward on the bolt said arm may be drawn in on the offset portion $c^2$ and allow the device to be operated to stop the elevator when it reaches the landing.

Instead of providing the rod $b^2$ with offset-points, as described, it may be cut away at such points, as shown at $e^2$ in Fig. 19.

Instead of arranging the invention on the front of the car, as shown, it may be arranged on one side, in which case instead of the end of the shaft $e$ or the plate or disk on the outer end of the shaft being stopped by the door when the latter is open, or partially open, and so prevent the clutch members $i$ $j$ from being brought into mesh and effecting the starting of the car, it may act against a slide $x$ which may be moved in unison with the door by means of segmented miter-gears $y$ $z$, each provided with an arm $a$ connected through the medium of pitmen respectively with the door and with the said slide $x$, as shown in Fig. 9. Again, instead of providing the rod $e$ with the pin $l$ acting in the cam-groove $k$ of the bushing-bearing, I may provide the said shaft $e$ with a disk $b'$ having a cam projection $c'$ adapted to act on a cam projection $d'$ supported in a stationary manner, and provide the inner face of the clutch member $j$ with a cam projection $e'$ adapted to act upon a stationary cam-surface at its back, so that by turning the shaft $e$, through the medium of the handle $m$, the clutch members $i$ $j$ may be moved into and out of mesh, all as will be understood by an inspection of Figs. 10 to 13, inclusive. In Fig. 10 the clutch members $i$ $j$ are shown out of mesh, while in Fig. 13 they are shown as in mesh.

Instead of employing two pins $z$ on the shaft $e$, as shown, I may use but one such pin, constructing the cam-groove in the bushing accordingly.

I may provide the door of the car with a grooved guideway $f'$ and the door of the elevator-shaft frame with a rib $g'$, or vice versa, so that the rib may move in the grooved guideway and the doors thus become locked together, and thus prevent one from being opened or closed without opening or closing the other.

The device may be employed to act in conjunction with the door of the car by supporting it, say at a point $h'$, (see dotted lines in Fig. 1,) back from the extreme front of the car.

It is obvious that other changes may be made in the form and arrangement of the parts shown and described without departing from the nature or spirit of the invention, which broadly comprehends the employment of a flexible line and hand operative devices or means, substantially as described, for controlling the car in its movements, which means may be stopped against movement or against being actuated by the door or means connected with the door when the latter is not fully closed, so that the car cannot be set in motion either up or down until the door is shut.

Having thus explained the nature of the invention and described a way of constructing and using the same, though without attempting to set forth all of the forms in which it may be made or all of the modes of its use, it is declared that what is claimed is—

1. A car controlling device for elevators, comprising a flexible line for controlling the motor, and a hand device on the car for operating the same, combined with a movable door, and a device normally disconnected from the controlling line, and coacting with said door for preventing the operation of said hand device when the door is moved toward open position and until it is closed.

2. The combination with an elevator car adapted to move up and down in an elevator well or shaft, a rope for controlling the motor, a hand operative device on the car, operative connections between said hand operative device and said rope, a door, and devices constructed and arranged to co-act with the door and with the said operative connections for locking the latter and for preventing their operation when the door is moved toward open position and until it is closed.

3. A car-controlling device, comprising a controlling line, a device for shifting said line, a cushioning mechanism for gradually stopping the travel of the car, and a hand device for connecting the cushioning mechanism with the said line shifting device.

4. A car controlling device, comprising a controlling line, a device on the car for shifting said line, an air brake consisting of a cylinder, and a piston, and a hand device for connecting the line shifting device with the said air brake for gradually stopping the travel of the car.

5. A car controlling device, comprising a controlling line, a hand device for shifting said line, secondary mechanism for shifting said line to stop the motor, and means to prevent the operation of said secondary mechanism, except when the car is near a landing.

6. The combination with an elevator car adapted to move up and down in an elevator well or shaft, a rope for controlling the motor, a hand operative device on the car, operative connections between said rope and said hand operative device, whereby the rope is under the control of the operative on the car, means on the car for automatically stopping the movements of the car, and a hand device on the car for connecting said automatic stopping means with said operative connections, whereby said stopping means may be thrown into operation to automatically stop the car.

7. A car-controlling device for elevators comprising in its construction a rope for controlling the motor, and a handle within the car operatively connected with the said rope, the said connecting means embracing a clutch, combined with the elevator door provided with devices co-acting with the said handle and its connections to prevent the operation of the handle after the door is moved to open it and until it is fully closed.

8. A car-controlling device for elevators or lifts, comprising in its construction a shaft mounted to turn and also to move longitudinally in its bearings, a plate or disk on one end of the said shaft co-acting with the elevator door whereby the shaft is prevented from outward movement except when the said door is closed, a starting rope, a wheel or pulley loose on the said shaft and engaged by the said rope, a clutch arranged to connect the pulley and shaft, and a handle for actuating said shaft.

9. A car-controlling device for elevators or lifts comprising in its construction a shaft mounted to turn and also to move longitudinally in its bearings, a plate or disk on one end of the said shaft co-acting with the elevator door whereby the shaft is prevented from outward movement except when the said door is closed, a starting rope, a wheel or pulley loose on the said shaft and engaged by the said rope, a clutch-member compounded or connected with the said wheel or pulley, a like clutch member fast on the shaft and adapted to engage the first-mentioned clutch member, and a handle for actuating the said shaft.

10. A car-controlling device for elevators or lifts comprising in its construction a shaft mounted to turn and also to move longitudinally in its bearings, a plate or disk on one end of the said shaft co-acting with the elevator door whereby the shaft is prevented from outward movement except when the said door is closed, a starting rope, a wheel or pulley loose on the said shaft and engaged by the said rope, a clutch-member compounded or connected with the said wheel or pulley, a like clutch-member fast on the shaft and adapted to engage the first-mentioned clutch-member, a cam adapted to engage means connected with the shaft to move the said shaft longitudinally, and a handle for turning the shaft, as set forth.

11. A car-controlling device for elevators or lifts comprising in its construction a starting rope, a rotary pulley engaging the said rope, the said pulley having a gear compounded or connected therewith, a longitudinally movable bolt or pin, a gear on said bolt or pin adapted to be moved into and out of mesh with the first-mentioned gear, and a brake connected with the second mentioned gear to stop it and the first mentioned gear when the two gears are brought into mesh, and so stop the pulley, move the starting rope, and stop the car, as set forth.

12. In elevator controlling apparatus, the combination of a normally stationary cable associated with so as to control the application of the motor and along which the car moves, with an idler on the car against which such cable always bears, a hand-operated device on the car, and means for engaging and disengaging the hand-operated device and the idler.

13. In a car-controlling device for elevators or lifts, a starting rope arranged outside of the car, a pulley engaging the said rope, a handle on the inside of the car and a clutch for operatively connecting the handle with the pulley, whereby the pulley may be actuated by the handle, as set forth.

14. In a car-controlling device for elevators or lifts a pulley on the car and engaging the controlling rope, mechanism for stopping the pulley, a spring pressed bolt for throwing said mechanism into and out of operative adjustment, a rod extending through the elevator well and provided with offset portions, and a laterally extending arm on said bolt and arranged to bear against said rod.

15. In a car-controlling device for elevators or lifts, a starting rope, a pulley engaging said rope, a handle and a clutch for operatively connecting the handle with the pulley whereby the pulley may be actuated by the handle.

16. In a car-controlling device for elevators or lifts, a pulley on the car and engaging the controlling rope, mechanism for stopping the pulley, a spring pressed bolt for throwing said mechanism into and out of operative adjustment and having a lateral extension, and a rod or bar extending through the elevator well in a position to be engaged by the lateral extension of the spring-pressed bolt, and whose continuity in one plane is broken at intervals, substantially as and for the purpose described.

In testimony whereof I hereunto set my hand this 14th day of December, 1894.

CHARLES A. HARKNESS.

In presence of—
C. C. STECHER,
M. B. MAY.